United States Patent [19]
Willmann

[11] Patent Number: 5,123,716
[45] Date of Patent: Jun. 23, 1992

[54] HYDRAULIC DUAL-CIRCUIT BRAKE SYSTEM

[75] Inventor: Karl-Heinz Willmann, Freiberg/N, Fed. Rep. of Germany

[73] Assignee: Robert Bosch GmbH, Stuttgart, Fed. Rep. of Germany

[21] Appl. No.: 674,841

[22] Filed: Mar. 25, 1991

[30] Foreign Application Priority Data

May 18, 1990 [DE] Fed. Rep. of Germany ....... 4015945
Jan. 31, 1991 [DE] Fed. Rep. of Germany ....... 4102864

[51] Int. Cl.$^5$ .......... B60T 8/32; B60T 8/44; B60T 8/48; B60K 28/16
[52] U.S. Cl. .............. 303/113 TR; 180/197; 303/116 SP; 303/119 R
[58] Field of Search ............ 303/113 TR, 113 TB, 303/113 R, 114 R, 116 R, 116 SP, 116 WP, 116 PC, 119 R, 119 SV, 110, 111, 150, 115 VM, DIG. 5, DIG. 6; 180/197; 188/181 A, 181 C, 181 T, 181 R

[56] References Cited

U.S. PATENT DOCUMENTS

| | | | |
|---|---|---|---|
| 4,846,532 | 7/1989 | Friedow et al. | 303/115 VM |
| 4,861,118 | 8/1989 | Burckhardt et al. | 303/116 R |
| 5,026,127 | 6/1991 | Arikawa | 303/116 R |

FOREIGN PATENT DOCUMENTS

| | | | |
|---|---|---|---|
| 0261563 | 11/1987 | Japan | 303/113 TR |
| 0012964 | 1/1989 | Japan | 303/116 R |

Primary Examiner—Douglas C. Butler
Attorney, Agent, or Firm—Edwin E. Greigg; Ronald E. Greigg

[57] ABSTRACT

A hydraulic dual-circuit brake system, with an anti-skid system (ABS) and traction control (ASR) for motor vehicles having a four-channel hydraulic unit with control valves, a return pump with two separate pump elements for each brake circuit, and two low-pressure reservoirs connected to the inlets of the pump elements. For supplying brake pressure in the traction control mode, at least one brake fluid reservoir is provided, which communicates with a pump element assigned to a brake circuit having at least one driven wheel, and a reversing valve is disposed in each connecting line between the master brake cylinder and the outlet of such a pump element. For the sake of problem-free initiation of braking during the traction control mode without the danger of unstable driving conditions, the brake fluid reservoir embodied as an active, controllable reservoir, and the reversing valve is embodied such that in its reversed position a check valve having a blocking direction toward the master brake cylinder is operative.

35 Claims, 5 Drawing Sheets

HYDRAULIC DUAL-CIRCUIT BRAKE SYSTEM

BACKGROUND OF THE INVENTION

The invention is based on a hydraulic dual-circuit brake system with an anti-skid system (ABS) and traction control (ASR) for motor vehicles.

In a known dual-circuit brake system of this type, with front-axle/rear-axle brake circuit distribution (German Patent 38 00 854 A1 now U.S. Pat. No. 4,846,532), the brake fluid reservoir is embodied by the pressure chamber of a vacuum cell, which in traction control can be connected by means of a switching valve to the inlet of the pump element of the return pump assigned to the brake circuit for the driven wheels of the rear axle. The vacuum cell is divided by a diaphragm into two chamber sections. The diaphragm is connected to a pressure piston that is axially displaceable in the pressure chamber counter to a restoring spring and as a result produces a brake fluid pressure. To fill the pressure chamber with brake fluid, a vacuum is generated in the vacuum cell, so that the pressure piston, under the force of the restoring spring, makes the largest possible volume available in the pressure chamber; via the switch valve, this volume is filled with brake fluid from the master brake cylinder or from a separate brake fluid tank. In traction control, the outer chamber segment of the vacuum cell is vented. The negative pressure remaining in the other chamber segment effects a return of the diaphragm, which carries the pressure piston with it counter to the force of the restoring spring and thus generates a brake fluid pressure in the pressure chamber. Via the reversed switch valve, the brake fluid is fed at sufficient charge pressure into the pump element of the return pump. Simultaneously, the reversing valve in the connecting line between the master brake cylinder and the brake circuit of the driven wheels is reversed, so that the brake circuit is disconnected from the master brake cylinder.

During the entire traction control process, the vacuum cell generates a charge pressure that varies slightly and is adequate to supply the return pump with brake fluid. The return pump thus generates a permanently high brake supply pressure, which is above the maximum possible brake pressure of the wheel brake cylinders. The brake pressure necessary for braking a spinning driven wheel is established by constant switching of the control valve, assigned to this driven wheel, between a pressure buildup position and a pressure holding or pressure reduction position in the wheel brake cylinder of the spinning driven wheel.

If the brake pedal is actuated during traction control, then if no other provision is made a brake pressure buildup in the wheel brake cylinders of the wheels of the driven axle is not possible, while such a brake pressure is built up in the wheel brake cylinders of the wheels of the non-driven axle. This unilateral buildup of brake pressure leads to unstable road handling situations, which must be avoided. One such particular provision to avoid these unstable road-handling situations is that both the reversing valve and the switch valve are restored upon brake pedal actuation, so that on the one hand the communication between the master brake cylinder and the brake circuit of the driven wheels is re-established, and on the other, the brake fluid reservoir is again disconnected from the brake circuit of the driven wheels. An electric signal transducer that recognizes the actuation of the brake pedal is necessary for this purpose. A brake light switch is typically used as such a signal transducer. However, if it should fail, the aforementioned disadvantage of unstable driving conditions arises.

OBJECT AND SUMMARY OF THE INVENTION

The dual-circuit brake system has advantage over the prior art that initiation of braking during traction control is unproblematic and does not lead to unstable vehicle performance, which in the case of front-wheel drive vehicles for instance arise from overbraking of the rear axle. Even if a brake light switch optionally provided for the restoration of the reversing valve fails, it is assured that the necessary brake pressure will be established both in the wheel brake cylinders of the driven wheels and in those of the non-driven wheels. This is assured on the one hand by the check valve, disposed in the connecting line of the master brake cylinder to the control valves assigned to the driven wheels, which becomes operative upon switchover of the reversing valve, and on the other hand, is assured in that for brake pressure buildup during traction control, the brake pressure is not established by switching of the control valves at an approximately constant brake supply pressure generated by the return pump, but rather by controlling the charge pressure of the brake fluid reservoir. The control valves of the driven wheels are therefore always in their open position, and the brake pressure established in the wheel brake cylinder prevails in the entire line region as far as the check valve in the connecting line to the master brake cylinder, so that upon initiation of braking this brake pressure can be transmitted by the brake pressure of the master brake cylinder, via the check valve.

As in the prior art, the closed brake circuit is maintained during traction control in the dual-circuit brake system of the invention as well. Any possible leakage losses can be compensated for via the control valves assigned to the driven wheels, to this end, in a further embodiment of the invention, these valves comprise two separate 2/2-way magnet valves, each forming one inlet and outlet valve, the outlet valves being switched over into its open position, so that the brake fluid reservoir, via the opened inlet and outlet valves, and the corresponding connecting lines to the brake circuit outlets, communicate with the master brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
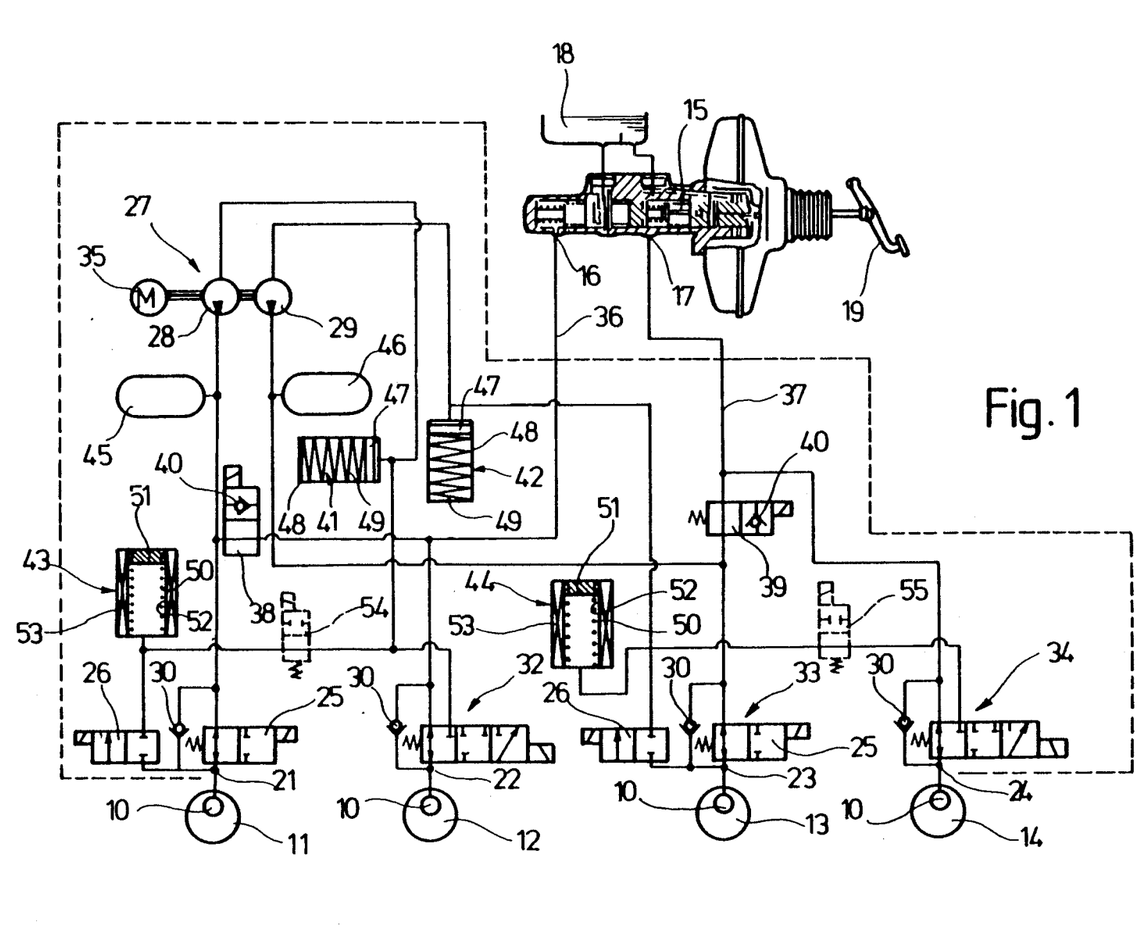
FIGS. 1, 2, 3 and 4 each show a block circuit diagram of a dual-circuit brake system with diagonal brake circuit distribution, an anti-skid system and traction control for a passenger car, in various exemplary embodiments.

In the hydraulic dual-circuit brake system with diagonal brake circuit distribution, an anti-skid system (ABS) and traction control (ASR) shown in the form of a block circuit diagram in FIG. 1 and intended for a passenger car, the driven wheels, which are generally mounted on the front axle, are represented by numerals 11 and 13, and the non-driven wheels of the rear axle are represented by the numerals 12 and 14. The wheel brake cylinders 10 of the driven and non-driven wheels 11 to 14 belong to different brake circuits, so that one driven wheel 11 or 13 and one non-driven wheel 12 or 14 are present in each brake circuit.

In a manner known per se, the dual-circuit brake system includes a master brake cylinder 15, which has two separate brake circuit outlets 16, 17 each for the connection of one of the two brake circuits, and which communicates with a brake fluid tank 18. Upon actuation of the brake pedal 19, a brake pressure of equal magnitude is controlled at both brake circuit outlets 16, 17. The dual-circuit brake system also includes a four-channel hydraulic unit, which has four outlet channels 21 to 24, to each of which one wheel brake cylinder 10 of the wheels 11 to 14 is connected. One control valve 31 to 34 is assigned to each outlet channel 21 to 24. The control valves 31 to 34 are controlled by control electronics not shown here. The control valves for the non-driven wheels 12, 14 are embodied as 3/2-way magnet valves with spring restoration, while the control valves 31, 33 of the driven wheels 11, 13 each comprise one inlet valve 25 and one outlet valve 26, which are embodied as 2/2-way magnet valves with spring restoration. Each control valve 31 to 34 is bypassed by a one-way check valve 30 the blocking direction is toward the outlet channel 21 to 24. A return pump 27, which is a component of the four-channel hydraulic unit 20, has two pump elements 28, 29, which are driven in common by an electric motor 35. The pump elements 28, 29 serve to return brake fluid to the master brake cylinder 15 upon a pressure reduction in the wheel brake cylinders 10. One pump element 28, 29 each is operative in one brake circuit, and can be made to communicate on the input side with the wheel brake cylinders 10 of the vehicle wheels 11 to 14, in each case, via the two control valves 31, 32 or 33, 34 assigned to the same brake circuit, and on the output side communicates via a connecting line 36, 37 with the brake circuit outlets 16, 17 of the master brake cylinder 15. The pump elements 28, 29 are provided in a conventional manner with one one-way pump inlet valve and one one-way pump outlet valve each, which are not shown here for the sake of simplicity. One reversing valve 38 and 39 is disposed on each of the connecting lines 36, 37, respectively. Each reversing valve 38, 39 is embodied as a 2/2-way magnet valve with spring restoration, which is open in its basic position and makes the applicable connecting line 36 to 37 passable, and in its reversed position connects a one-way check valve 40, the blocking direction of which is toward the master brake cylinder 15, into the applicable connecting line 36 or 37. The inlet valve 25 of the control valve 31 is connected to the outlet of the pump element 28, and the inlet valve 25 of the control valve 33 is connected to the outlet of the pump element 29, while the control valves 32, 34 of the non-driven wheels 12, 14 are connected to the applicable brake circuit outlet 16 or 17 to which they are assigned of the master brake cylinder 15. A low-pressure reservoir 41 and 42 and a brake fluid reservoir 43 and 44, respectively, are connected to the inlet of each pump element 28, 29, while a respective damping chamber 45 and 46 is connected to the outlets of the pump elements 28, 29. The low-pressure reservoirs 41, 42 are identically embodied and have a spring-loaded reservoir piston 47, which is axially displaceable in a reservoir cylinder 48. The low-pressure reservoirs 41, 42 are capable of receiving excess brake fluid, and the reservoir piston 47, with the compression of the reservoir spring 49, is displaced into the reservoir cylinder 48.

The two brake fluid reservoirs 43, 44 are identical and are each embodied as active reservoirs that are controllable in terms of the reservoir or charge pressure generated inside them. Each brake fluid reservoir 43, 44 has a reservoir piston 51 that is loaded by a reservoir spring 50 and is axially displaceably guided in a reservoir cylinder 52. The reservoir piston 51 is drivable for the axial displacement here by means of an electromagnet 53, symbolized here by its coil winding. Depending on the magnitude of magnet excitation, the reservoir piston 51 executes a defined piston stroke. The reservoir piston 51 may instead be driven in the same manner by an electric motor, compressed air or a vacuum.

The modes of operation of the dual-circuit brake system upon brake pedal actuation and in ABS operation are known, so that no further detail of these modes needs to be provided here. In the ABS mode, the necessary brake pressure is established by switching of the control valves 31 to 34, with the control valves 31 to 3 being switched back and forth between a pressure buildup, pressure holding and pressure reduction position. In the pressure reduction position, the wheel brake cylinders 10 communicate with the low-pressure reservoirs 41, 42, which temporarily hold the volume of brake fluid flowing out of the wheel brake cylinders 10. The pump elements 28, 29 of the switched-on return pump 27 pumps the outflowing volume of brake fluid back to the master brake cylinder 15, as a result of which the low-pressure reservoirs 41, 42 are pumped empty again. In traction control operation, accordingly whenever at least one of the driven wheels is exhibiting slip, the control electronics switch over the two reversing valves 38, 39, so that the check valves 40 are each connected into the connecting lines 36, 37. Both the pump elements 28, 29 and the inlet valves 25 of the control valves 31, 33 assigned to the driven wheels 11, 13 are thus blocked off from the master brake cylinder 15, while the control valves 32, 34 of the non-driven wheels 12, 14 continue to communicate with the master brake cylinder 15 as before. At the same time, the return pump 27 is switched on, and the two brake fluid reservoirs 43, 44 are activated. The brake fluid reservoirs 43, 44 each generate a charge pressure for the pump elements 28, 29, which in turn feed a high brake pressure into the wheel brake cylinders 10 of the driven wheels 11, 13, via the inlet valves 25, which are in their basic position, of the control valves 31, 33. If only one driven wheel 11 or 13 is spinning, then only the brake fluid reservoir 43 or 44 assigned to the spinning driven wheel 11 or 13 is activated. Since the pump elements 28, 29 of the return pump 27 are not embodied as self-aspirating, no brake pressure is therefore built up in the wheel brake cylinder 10 of the non-spinning driven wheel 11 or 13. The brake pressure in the wheel brake cylinder 10 required for braking the spinning driven wheel 11 or 13 is established by control of the charge pressure of the brake fluid reservoir 43 or 44. The inlet valves 25 are not triggered at this time. If only a low brake pressure is needed in the wheel brake cylinders 10, then the brake fluid reservoir 43 or 44, by corresponding control of the drive force of the reservoir piston 51, generates a relatively low charge pressure. If a higher brake pressure is necessary, then the brake fluid reservoir 43 or 44 of the return pump 27 makes a higher charge pressure available. Once the required brake pressure in the wheel brake cylinder 10 has been attained, the activation of the brake fluid reservoir 43 or 44 is cancelled. If the brake pressure in the wheel brake cylinder is to be reduced again after braking of the driven wheel 11 or 13 has occurred, then the outlet valve 26 of the control valve 31 or 33 is additionally reversed, so that a volume of brake fluid can now flow out of the wheel brake cylinder 10 int the brake fluid reservoir 43 or 44. At the end of the traction control operation, the low-pressure reservoir 41 or 42 is pumped empty by the pump elements 28 or 29, and all the brake fluid is pumped back into the brake fluid reservoir 43 or 44, via the inlet valve 25 and the reversed outlet valve 26. Next, the outlet valve 26 of the control valve 31 or 33 is reset, and the return pump 27 is switched off.

If the brake pedal 19 is actuated during the traction control mode, then the brake pressure is fe directly into the wheel brake cylinders 10 of the non-driven wheels 12, 14, via the brake circuit outlets 16, 17 and the control valves 32, 34, which are in their basic position. If the brake pressure controlled by the master brake cylinder 1 is higher than the brake pressure established at the moment in the wheel brake cylinders 10 of the driven wheels 11, 13 during the traction control mode then the check valve 40 opens into the connecting lines 36, 37, and the higher brake pressure of the master brake cylinder 15 is fed into the wheel brake cylinders 10 of the driven wheels 11, 13. An approximately equally high brake pressure is thus built up at both the front and the rear axles, and overbraking of the rear axle, which is the cause of unstable driving conditions, is reliably avoided.

In the traction control mode the attempt is made to prevent any reservoir piston motion in the low-pressure reservoir 41 or 42. The reservoir spring 50 must be suitably dimensioned for this purpose. If doing so presents problems, then the low-pressure reservoir 41 or 42 can be decoupled during the traction control mode by a cutoff valve 54 or 55, as shown in dashed lines in FIG. 1. The cutoff valve 54 or 55 is embodied as a 2/2-way magnet valve with spring restoration, which is connected in the connection line of the low-pressure reservoir 41 o 42 to the inlet of the associated pump element 28 or 29. In the unexcited basic position, the cutoff valve 54 or 55 is opened, so that the low-pressure reservoir 41 or 42 communicates with the pump element 28, 29, and in its reverse position it closes, thereby disconnecting the low-pressure reservoir 41 or 42 from the pump element 28 or 29.

Figure 2:
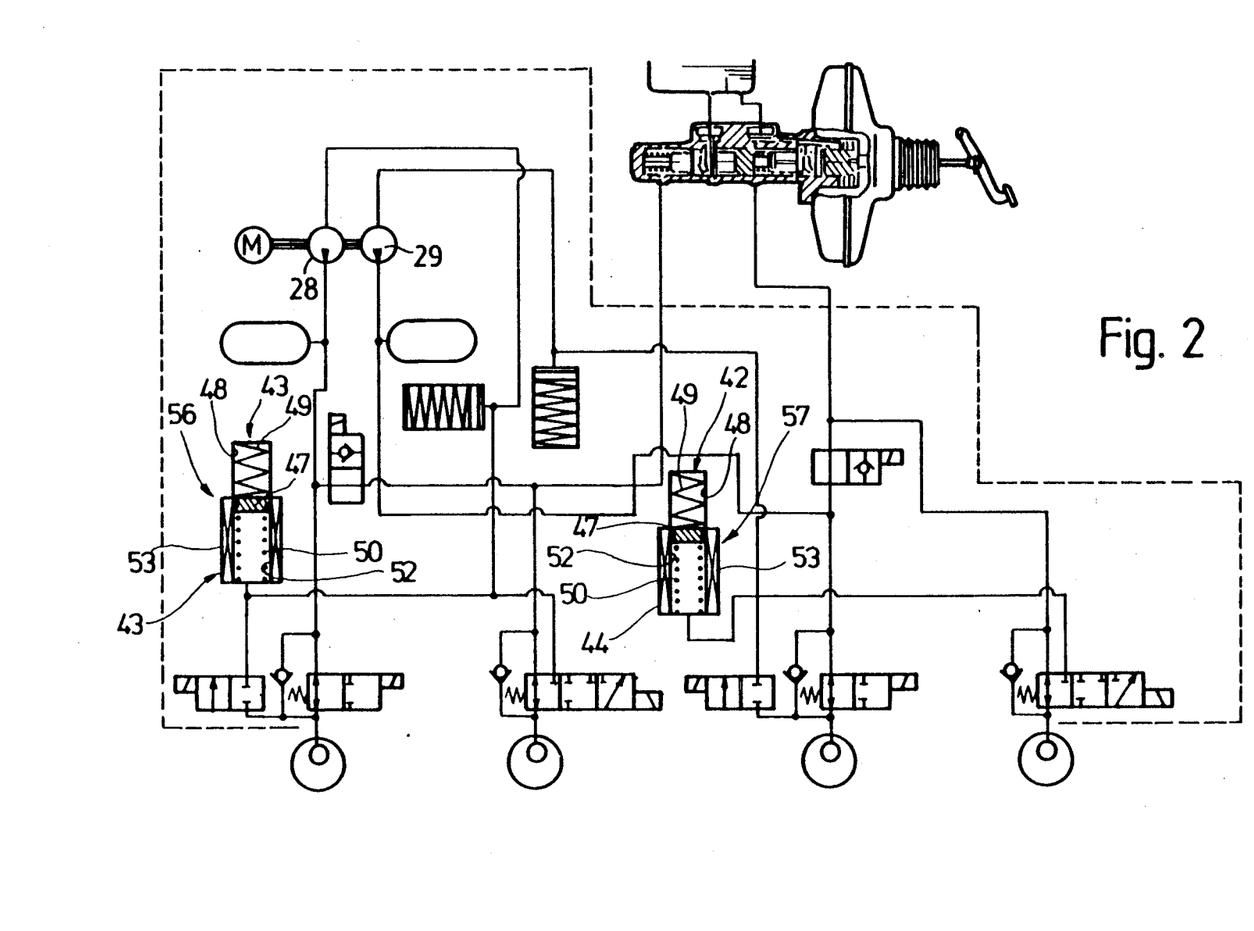

In the dual-circuit brake system of FIG. 2, the low-pressure reservoir 41 and 42 and the brake fluid reservoir 43 and 44 have been combined into a single reservoir in each brake circuit, that is, a so-called combined reservoir 56 or 57. The reservoir piston 47 is common to both reservoirs and is acted upon both by the reservoir spring 49 of the low-pressure reservoir 41 or 42 and by the reservoir spring 50 of the brake fluid reservoir 43 or 44. Otherwise, the dual-circuit brake system matches that of FIG. 1 in both structure and function, so no further reference numerals have been included in FIG. 2.

Figure 3:
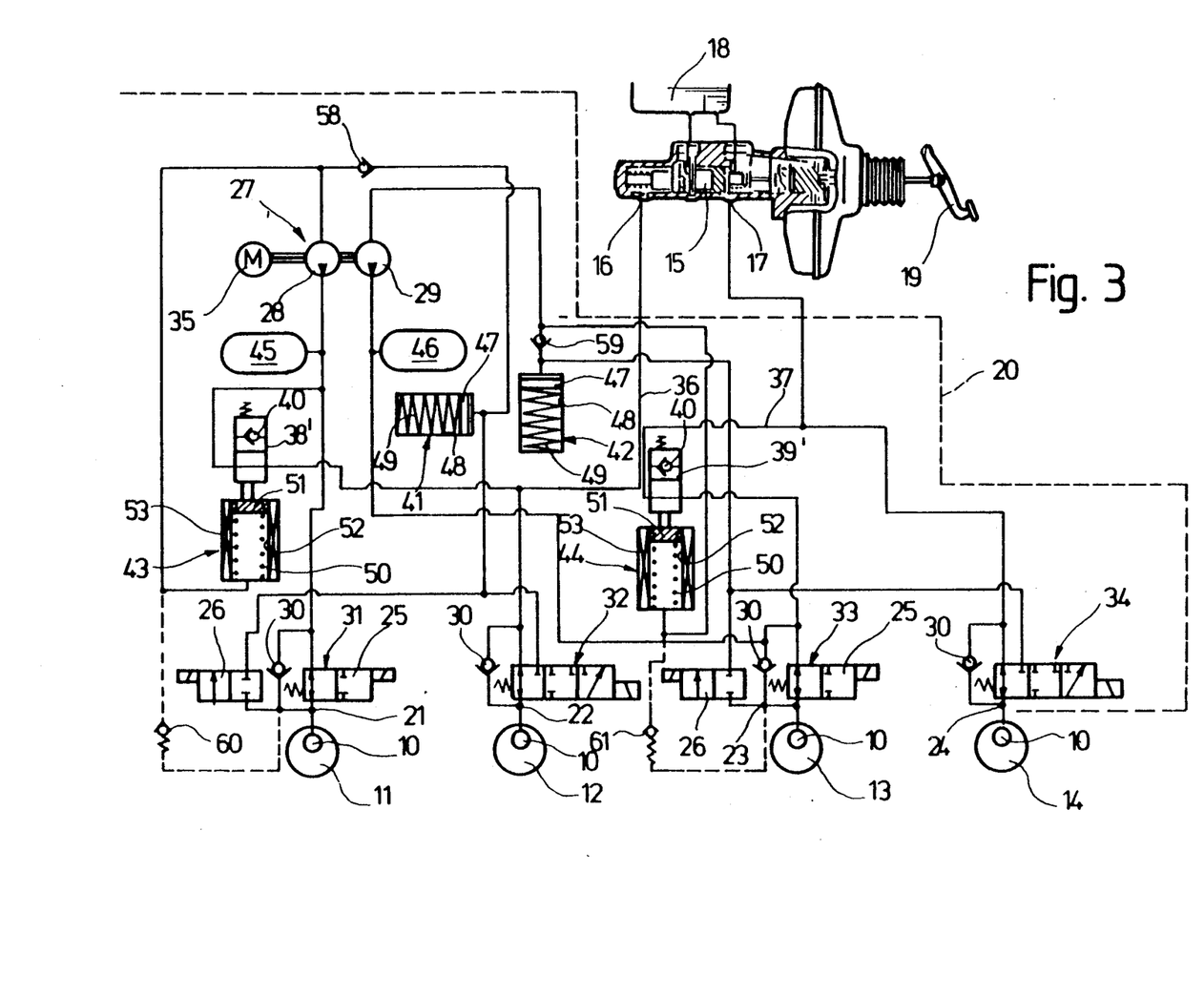

In the dual-circuit brake system shown in FIG. 3, the decoupling of the low-pressure reservoirs 41, 42 is effected not by electromagnetically actuated cutoff valves but rather by check valves 58, 59. The check valves 58, 59 are each incorporated in the connection between the control valves 31, 32 or 33, 34 and the inlet of the associated pump element 28 or 29 of the return pump 27, with their flow direction toward the pump elements 28, 29. The connection of the low-pressure reservoirs 41, 42 to the pump elements 28 and 29, respectively, is effected on the inlet side of the check valves 58, 59, so that the low-pressure reservoirs 41, 42 are capable of receiving brake fluid upon a brake pressure reduction, without first having to overcome the opening pressure of the check valves 58, 59. The reversing valves 38', 39' in the connecting lines 36, 37 to the master brake cylinder 15 are not actuated electromagnetically here as in FIGS. 1 and 2 but instead are switched over mechanically, in fact as a function of travel, that is, the displacement travel of the reservoir piston 51 of the brake fluid reservoirs 43, 44. As soon as the brake fluid reservoir 43 or 44 is activated, and thus the reservoir piston 51 is moved out of its basic position shown in FIG. 3 by a certain displacement path, the restoring spring of the reversing valve 38' or 39' switches it over, thereby connecting the applicable check valve 40 into the connecting line 36 or 37. The structure and mode of operation of the dual-circuit brake system of FIG. 3 is otherwise identical to that of FIG. 1, and so identical components have the same reference numerals.

Additionally, the dual-circuit brake system of FIG. 1, 2 or 3 can be provided with a fast-fill option, which makes the fastest possible buildup of pressure in the wheel brake cylinder 10 of a spinning driven wheel 11, 13 possible. This kind of fast fill operation is attained—as shown in dashed lines in FIG. 3—with the aid of a hydraulic connection between the brake fluid reservoir 43 or 44 and the outlet channel 21 or 23 for the wheel brake cylinders 10 of the driven wheels 11 or 13; a check valve 60 with a flow direction toward the outlet channel 21 or 23 is disposed in this connection. The brake fluid reservoir 43 or 44 is also embodied as "stronger" so that it is capable of generating a pressure of 10 to 20 bar. in that case it is advantageous to embody the reservoir piston 5 as a plunger driven by an electric motor. In this dual-circuit brake system, at the onset of the traction control, the wheel brake cylinders 10 of the driven wheels 11, 13 are filled with a large volumetric flow, which is composed of the brake fluid volume that directly reaches the wheel brake cylinders 10 from the brake fluid reservoirs 43 and 44, and of the brake fluid volume that is pumped into the wheel brake cylinders 10 of the driven wheels 11, 13 from the brake fluid reservoir 43 or 44 via the pump element 28 or 29 of the return pump 27 and by the inlet valves 35, in their basic position, of the control valves 31, 33. The quantity pumped by the return pump 27 can thus be designed for a higher pressure range, to compensate for the smaller volumetric capacity.

Figure 4:
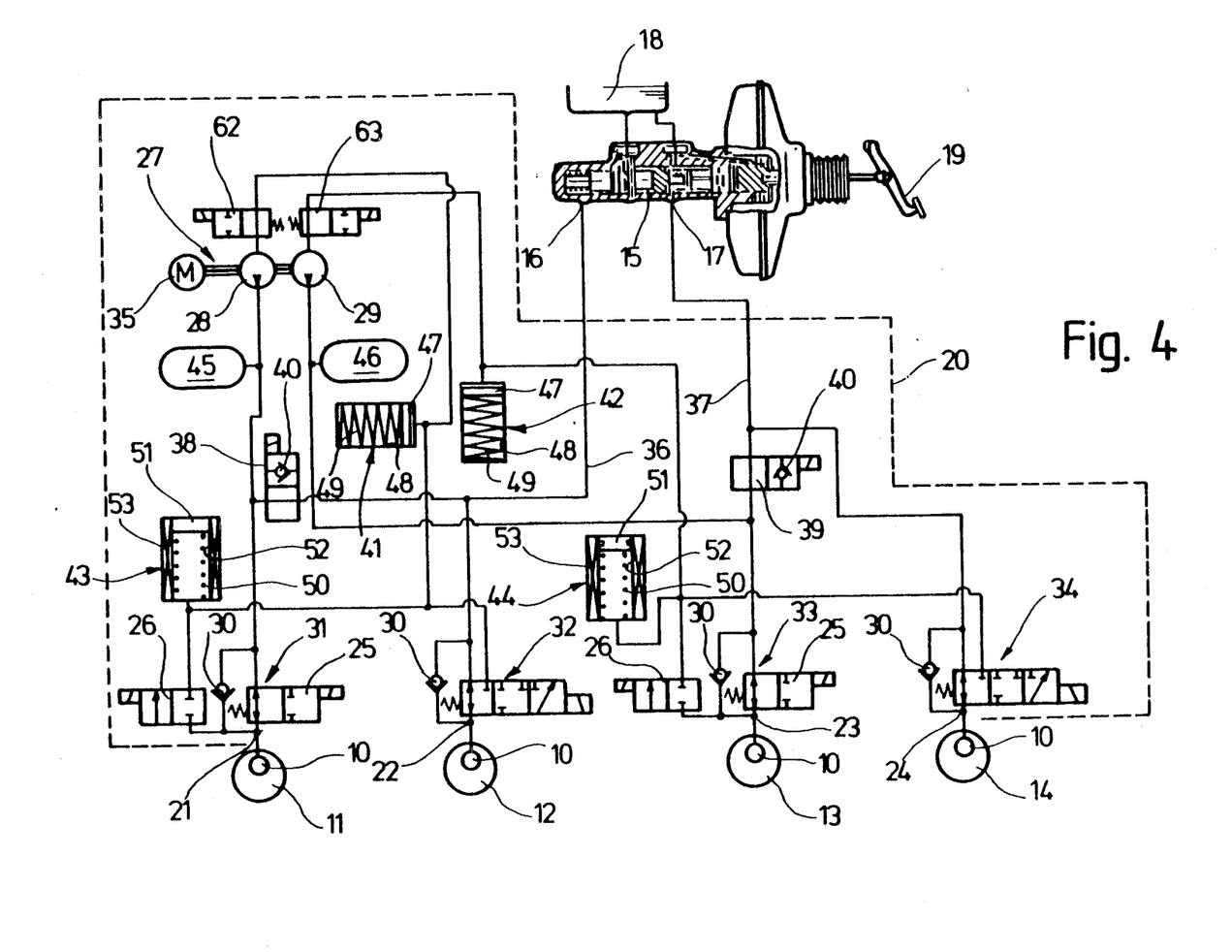

In the dual-circuit brake system shown in a block circuit diagram in FIG. 4, a cutoff valve 62 or 63 embodied as a 2/2-way magnet valve with spring restoration is disposed in the connection between the brake fluid reservoir 43 or 44 and the pump element 28 or 29 of the return pump 27. In their unexcited basic position, the cutoff valves 62, 63 assume their open position, so that both the low-pressure reservoir 41 or 42 and the brake fluid reservoir 43 or 44 communicate with the inlet of the pump element 28 or 29. The cutoff valves 62, 63 also maintain this basic position during the pressure buildup in the traction control mode. With the onset of the traction control mode, the brake fluid reservoir 43 or 44 that belongs to a spinning driven wheel 11 or 13 is activated, and remains so during the entire traction control operation. Once the necessary brake pressure is attained, then the applicable cutoff valve 62 or 63 is reversed to its closing position for pressure holding, so that the reservoirs 41 and 43 or 42 and 44 are respectively disconnected from the pump element 28 or 29. This position of the cutoff valves 62, 63 is also maintained upon pressure reduction, in which additionally the outlet valve 26 of the control valve 31 or 33 is reversed into its open position. The advantages of this dual-circuit brake system concept over that of FIG. 1 is that the brake fluid reservoirs 43, 44 can remain activated via a central energy source during the entire traction control operation and can therefore be simpler.

Figure 5:
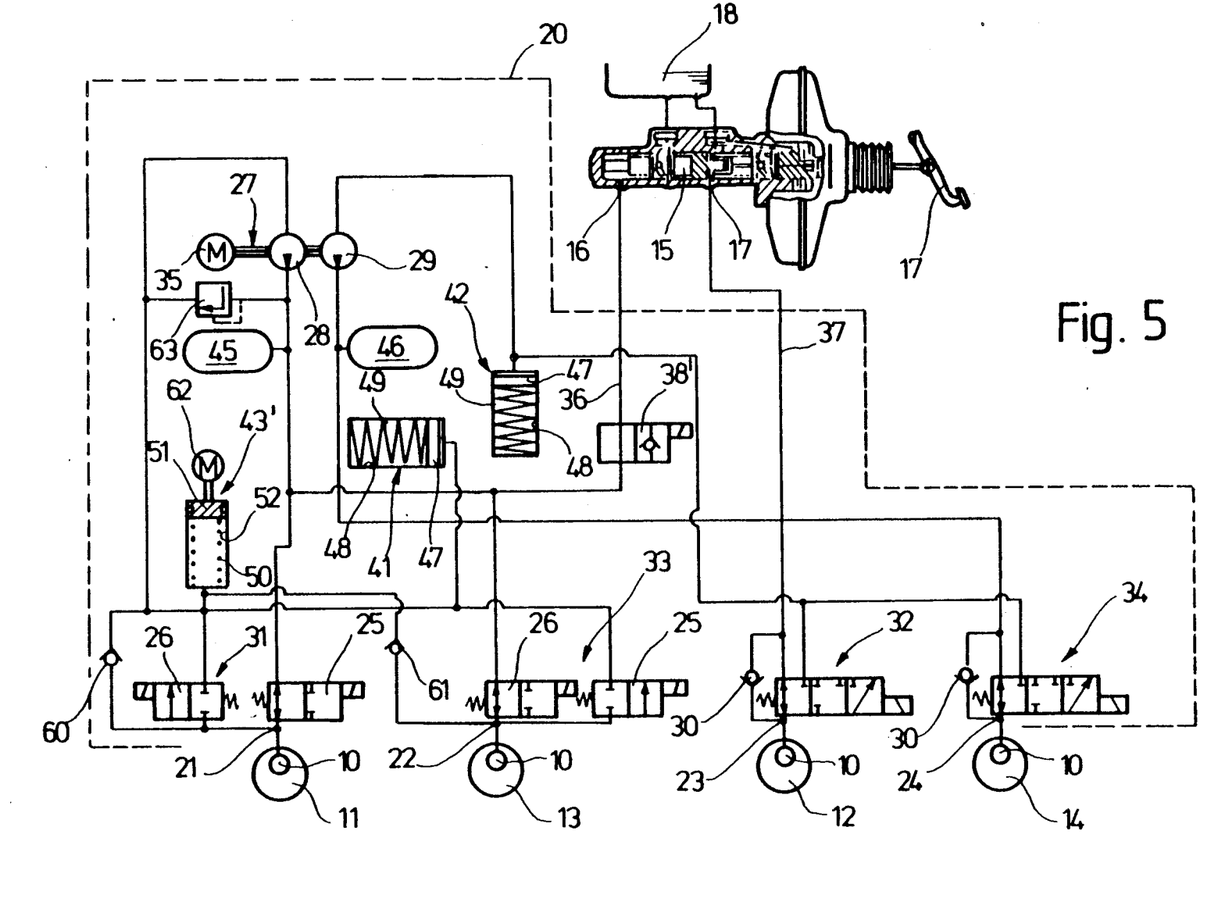
FIG. 5 is a block circuit diagram of a dual-circuit brake system with front/rear brake circuit distribution, an anti-skid system and traction control for a passenger car.

FIG. 5 is a block circuit diagram of a hydraulic dual-circuit brake system with front/rear or front-axle/rear-axle brake circuit distribution, an anti-skid system (ABS) and traction control (ASR) for a passenger car. The wheel brake cylinders 10 of the driven wheels 11, 13 are disposed in one brake circuit, and the wheel brake cylinders 10 of the non-driven wheels 12, 14 are disposed in the other brake circuit. Typically, the driven wheels 11, 13 are the rear wheels of the passenger car. In contrast to the dual-circuit brake system with diagonal brake circuit distribution, only one reversing valve 38 is present here, which is disposed in the connecting line 36 between the brake circuit outlet 16 of the master brake cylinder 15 and the control valves 31, 33 disposed in the brake circuit of the driven wheels, or the outlet of the pump element 28 of the return pump 27. Likewise, only one brake fluid reservoir 43' is present, the reservoir piston 51 of which is driven by an electric drive motor 62. The brake fluid reservoir 43' is connected to the inlet of the pump element 28, assigned to the brake circuit of the driven wheels 11, 13, of the return pump 27. Between the outlet and inlet of the pump element 28, a pressure limiting valve 63 is also connected, having an opening direction toward the inlet of the pump element 28. As in the dual-circuit brake system for diagonal brake circuit distribution of FIG. 3, a "fast-fill option" is again provided here for the wheel brake cylinders 10 of the driven wheels 11, 13; as shown in FIG. 3, this option is connected by means of the one-way check valves 60, 61 between the brake fluid reservoir 43' and the wheel brake cylinder 10 of the driven wheels 11, 13. During the entire traction control operation, the brake fluid reservoir 43' remains activated. In the pressure holding state, the inlet valve 25 of the spinning driven wheel 11 or 13 is closed. The same is true in the operating state of pressure reduction, in which additionally the outlet valve 26 is reversed into its opening position. In both operating states, the pump element 28 pumps via the pressure limiting valve 63.

The invention is not limited to the exemplary embodiments of the dual-circuit brake system that are described here. For instance, the dual-circuit brake system shown in FIG. 1 may also be operated during traction control in such a way that during all of the traction control operation, the brake fluid reservoir 43 or 44 of the particular driven wheel 11 or 13 that is spinning is activated, and the outlet valve 26 of the control valve 31 o 33 is triggered incrementally for pressure holding and is opened for pressure reduction. By regulating the current of the electric motor 35 of the return pump 27, the quality of control with respect to brake pressure built up in the wheel brake cylinders 10 of the driven wheels 11 13 can also be improved. Reducing the current produces a smaller supply quantity. In pressure buildup, the electric motor 35 is in operation, while in pressure holding and pressure reduction it is switched off. In pressure reduction, the outlet valve 26 of the control valve 31 or 33 is additionally opened as well.

The foregoing relates to preferred exemplary embodiments of the invention, it being understood that other variants and embodiments thereof are possible within the spirit and scope of the invention, the latter being defined by the appended claim.

What is claimed and desired to be secured by Letters Patent of the United States is:

1. A hydraulic dual-circuit brake system with an anti-skid system and traction control for wheel brakes for vehicle wheels of motor vehicles, having a master brake cylinder with two separate brake circuit outlets for first and second brake circuits for controlling a brake pressure to the wheel brakes including wheel brake cylinders of the vehicle wheels by brake pedal actuation; having a four-channel hydraulic unit with first, second, third and fourth outlet channels distributed to first and second brake circuits for connecting the wheel brake cylinders of the vehicle wheels, electromagnetic control valves associated with each of said first, second, third and fourth outlet channels (21-24) connected with one outlet channel each for controlling a brake pressure dependent on wheel slip in the wheel brake cylinders, said electromagnetic control valves are connected on an output side with an outlet channel each, and on an inlet side in pairs via a connecting line with each one of the brake circuit outlets of the main brake cylinder, a return pump (27) with two separate pumping elements (28, 29), each pump element is operative in one brake circuit, for returning brake fluid in the wheel brake cylinders upon brake pressure reduction, in which said pumping elements are each connected on a pump inlet side via the control valves to outlet channels belonging to the one brake circuit and on outlet side are connected via each one of the connecting lines to the brake circuit outlet of the master brake cylinder associated with that brake circuit, two low-pressure reservoirs (41, 42), each low-pressure reservoir is assigned to one brake circuit, for temporarily holding brake fluid upon brake pressure reduction, each of said low-pressure reservoirs are connected to the pump inlet side of one of said pump elements, a reversing valve disposed in each connecting line between one brake circuit outlet of the master brake cylinder and the pump outlet of a pump element assigned to a brake circuit assigned to at least one driven wheel, which reversing valve is triggered during the traction control operation, and at least one brake fluid reservoir (43, 44), which reservoir communicates with the pump inlet of the pump element assigned to the brake circuit having at least one driven wheel and which charges the pump inlet of the pump element with brake fluid in traction control operation, said brake fluid reservoir (43, 44; 43') is embodied as an active reservoir that is controllable with respect to a charge pressure generated by it; that the brake pressure in a wheel brake cylinder (10) of at least one driven wheel (11, 13) required in traction control operation is established by one of the associated pump elements (28, 29; 28) by controlling the charge pressure generated by the brake fluid reservoir (43, 44; 43'); and that the reversing valve (38, 39; 38) is embodied such that upon its triggering the reversing valve, a check valve (40) having a flow direction toward the input side of the pump element (28, 29; 28) is connected into one of the connecting lines (36, 37; 36) between the brake circuit outlet (16,17; 16) of the master brake cylinder (15) and the pump outlet of the pump element (28, 29; 28) assigned to the brake circuit having at least one driven wheel (11, 13).

2. A brake system as defined by claim 1, in which the brake fluid reservoir (43, 44; 43') has a reservoir cylinder (52) and a reservoir piston (51) axially displaceable in said reservoir cylinder, which piston is displaceable counter to the force of a restoring spring (50) by a drive mechanism (53; 62) consisting of one of the following: an electric motor, electromagnet, vacuum or compressed air.

3. A brake system as defined by claim 2, in which a cutoff valve (62, 63) is disposed between one of the brake fluid reservoirs (43, 44) and one of the associated pump elements (28, 29) and upon brake pressure buildup, said cutoff valve assumes an open position while in brake pressure holding and reduction said cutoff valve assumes a cutoff position; and that during the entire traction control operation the brake fluid reservoir (43, 44) remains activated.

4. A brake system as defined by claim 3, in which the cutoff valve (62, 63) is embodied as a 2/2-way magnet valve with spring restoration.

5. A brake system as defined by claim 2, in which the brake fluid reservoir (43, 44), in traction control operation, is activated during the brake pressure buildup and is deactivated during the brake pressure holding and reduction.

6. A brake system as defined by claim 5, in which the brake fluid reservoir (43, 44; 43') additionally communicates with at least one outlet channel (21, 23; 21, 22, assigned to at least one driven wheel (11, 13), of the four-channel hydraulic unit via a check valve (60, 61) having a flow direction toward the outlet channel (21, 23; 21, 22).

7. A brake system as defined by claim 5, in which one of the low-pressure reservoirs (41, 42), connected to the pump element (28, 29) is assigned to a brake circuit having at least one driven wheel (11, 13), and the brake fluid reservoir (43, 44) is connected to the same pump element (28, 29) and combined into a single reservoir.

8. A brake system as defined by claim 6, in which one of the low-pressure reservoirs (41, 42), connected to the pump element (28, 29) is assigned to a brake circuit having at least one driven wheel (11, 13), and the brake fluid reservoir (43, 44) is connected to the same pump element (28, 29) and combined into a single reservoir.

9. A brake system as defined by claim 1, in which a cutoff element (54, 55; 58, 59), which during traction control disconnects one of the low-pressure reservoirs (41, 42) from the pump element (28, 29), said cutoff element is disposed in a connection between the pump inlet of the pump element (28, 29) of the return pump (27) assigned to one brake circuit having at least one driven wheel (11), and the low-pressure reservoir (41, 42) connected to this pump element.

10. A brake system as defined by claim 2, in which a cutoff element (54, 55; 58, 59), which during traction control disconnects one of the low-pressure reservoirs (41, 42) from the pump element (28, 29), said cutoff element is disposed in a connection between the pump inlet of the pump element (28, 29) of the return pump (27) assigned to one brake circuit having at least one driven wheel (11), and the low-pressure reservoir (41, 42) connected to this pump element.

11. A brake system as defined by claim 3, in which a cutoff element (54, 55; 58, 59), which during traction control disconnects one of the low-pressure reservoirs (41, 42) from the pump element (28, 29), said cutoff elements disposed in a connection between the pump inlet of the pump element (28, 29) of the return pump (27) assigned to one brake circuit having at least one driven wheel (11), and the low-pressure reservoir (41, 42) connected to this pump element.

12. A brake system as defined by claim 9, in which the cutoff element is embodied as a 2/2-way magnet valve (54, 55), which in an unexcited basic position establishes a communication between one of the low-pressure reservoirs (41, 42) and the pump input of the pump element (28, 29) and disconnects the communication in a reversed position.

13. A brake system as defined by claim 10, in which the cutoff element is embodied as a 2/2-way magnet valve (54, 55), which in unexcited basic position establishes a communication between one of the low-pressure reservoirs (41, 42) and the pump element of the pump element (28, 29) and disconnects the communication in a reversed position.

14. A brake system as defined by claim 11, in which the cutoff element is embodied as a 2/2-way magnet valve (54, 55), which in unexcited basic position establishes a communication between one of the low-pressure reservoirs (41, 42) and the pump element of the pump element (28, 29) and disconnects the communication in a reversed position.

15. A brake system as defined by claim 9, in which the cutoff element is embodied as a check valve (58, 59), which is disposed in a connection line, which is established via a control valve (31, 33), between an outlet channel (21, 23) of the four-channel hydraulic unit (20) assigned to a driven wheel (11, 13), and the pump inlet of the pump element (28, 29) of the return pump (27) assigned to this outlet channel (21, 23), the check valve having a flow direction toward the pump inlet of the pump element (28, 29), and that the connection of the low-pressure reservoir (41, 42) assigned to this pump element (28, 29) is made on an inlet side of the check valve (58, 59).

16. A brake system as defined by claim 10, in which the cutoff element is embodied as a check valve (58, 59), which is disposed in a connection line, which is established via a control valve (31, 33), between an outlet channel (21, 23) of the four-channel hydraulic unit (20) assigned to a driven wheel (11, 13), and the pump inlet of the pump element (28, 29) of the return pump (27) assigned to this outlet channel (21, 23), the check valve having a flow direction toward the pump inlet of the pump element (28, 29), and that the connection of the low-pressure reservoir (41, 42) assigned to this pump element (28, 29) is made on an inlet side of the check valve (58, 59).

17. A brake system as defined by claim 11, in which the cutoff element is embodied as a check valve (58, 59), which is disposed in a connection line, which is established via a control valve (31, 33), between an outlet channel (21, 23) of the four-channel hydraulic unit (20) assigned to a driven wheel (11, 13), and the pump inlet of the pump element (28, 29) of the return pump (27) assigned to this outlet channel (21, 23), the check valve having a flow direction toward the pump inlet of the pump element (28, 29), and that the connection of the low-pressure reservoir (41, 42) assigned to this pump element (28, 29) is made on an inlet side of the check valve (58, 59).

18. A brake system as defined by claim 1, in which the reversing valve (38, 39) is embodied as a 2/2-way magnet valve with spring restoration, which in an unexcited basic position assumes an open position and in a reversed position assumes a closing position.

19. A brake system as defined by claim 2, in which the reversing valve (39, 39) is embodied as a 2/2-way magnet valve with spring restoration, which in an unexcited basic position assumes an open position and in a reversed position assumes a closing position.

20. A brake system as defined by claim 3, in which the reversing valve (38, 39) is embodied as a 2/2-way magnet valve with spring restoration, which in an unexcited basic position assumes an open position and in a reversed position assumes a closing position.

21. A brake system as defined by claim 2, in which the reversing valve (38', 39') is embodied as a mechanically actuated valve with spring restoration, an opening and closure of which are effected as a function of a displacement path of the reservoir piston (51) of the brake fluid reservoir (43, 44).

22. A brake system as defined by claim 3, in which the reversing valve (38', 39') is embodied as a mechanically actuated valve with spring restoration, an opening and closure of which are effected as as function of a displacement path of the reservoir piston (51) of the brake fluid reservoir (43, 44).

23. A brake system as defined by claim 4, in which the reversing valve (38', 39') is embodied as a mechanically actuated valve with spring restoration, an opening and closure of which are effected as a function of a displacement path of the reservoir piston (51) of the brake fluid reservoir (43, 44).

24. A brake system as defined by claim 1, in which at least the control valves (31, 33) connected to the outlet channels (21, 23; 21, 22) for the wheel brake cylinders (10) of the driven wheels (11, 13) each comprise two 2/2-way magnet valves with spring restoration, of which an inlet valve (25) which is opened in a basic position communicates with the outlet channel (21, 23; 21, 22) and with the outlet of the associated pump element (28, 29) and with the connecting line (36, 37) to the associated brake circuit outlet (16, 17) of the master brake cylinder (15), and an outlet valve (26) that is closed in a basic position is connected to the outlet channel (21, 23; 21, 22) and to the pump inlet of the associated pump element (28, 29).

25. A brake system as defined by claim 2, in which at least the control valves (31, 33) connected to the outlet channels (21, 23; 21, 22) for the wheel brake cylinders (10) of the driven wheels (11, 13) each comprise two 2/2-way magnet valves with spring restoration, of which an inlet valve (25) which is opened in a basic position communicates with the outlet channel (21, 23; 21, 22) and with the outlet of the associated pump element (28, 29) and with the connecting line (36, 37) to the associated brake circuit outlet (16, 17) of the master brake cylinder (15), and an outlet valve (26) that is closed in a basic position is connected to the outlet channel (21, 23; 21, 22) and to the pump inlet of the associated pump element (28, 29).

26. A brake system as defined by claim 3, in which at least the control valves (31, 33) connected to the outlet channels (21, 23; 21, 22) for the wheel brake cylinders (10) of the driven wheels (11, 13) each comprise two 2/2-way magnet valves with spring restoration, of which an inlet valve (25) which is opened in a basic position communicates with the outlet channel (21, 23; 21, 22) and with the outlet of the associated pump element (28, 29) and with the connecting line (36, 37) to the associated brake circuit outlet (16, 17) of the master brake cylinder (15), and an outlet valve (26) that is closed in a basic position is connected to the outlet channel (21, 23; 21, 22) and to the pump inlet of the associated pump element (28, 29).

27. A brake system as defined by claim 1 in which the brake fluid reservoir (43, 44) is activated during the entire traction control operation; that for pressure buildup in the wheel brake cylinder (10) of at least one spinning driven wheel (11, 13), an associated outlet valve (26) is closed, and that for pressure holding, the outlet valve (26) is triggered incrementally and for pressure reduction it is opened.

28. A brake system as defined by claim 2, in which the brake fluid reservoir (43, 44) is activated during the entire traction control operation; that for pressure buildup in the wheel brake cylinder (10) of at least one spinning driven wheel (11, 13), an associated outlet valve (26) is closed, and that for pressure holding, the outlet valve (26) is triggered incrementally and for pressure reduction it is opened.

29. A brake system as defined by claim 3, in which the brake fluid reservoir (43, 44) is activated during the entire traction control operation; that for pressure buildup in the wheel brake cylinder (10) of at least one spinning driven wheel (11, 13), an associated outlet valve (26) is closed, and that for pressure holding, the outlet valve (26) is triggered incrementally and for pressure reduction it is opened.

30. A brake system as defined by claim 24, in which the brake fluid reservoir (43, 44) is activated during the entire traction control operation; that for pressure buildup in the wheel brake cylinder (10) of at least one spinning driven wheel (11, 13), an associated outlet valve (26) is closed, and that for pressure holding, the outlet valve (26) is triggered incrementally and for pressure reduction it is opened.

31. A brake system as defined by claim 27, in which the pump element (28, 29) of the return pump (27) communicating with the brake fluid reservoir (43) is driven by an electric motor (35), the current of which is regulated during traction control for pressure buildup purposes.

32. A brake system as defined by claim 31, in which the return pump (27) is switched off during traction control upon pressure holding and reduction.

33. A brake system as defined by claim 1, in which the driven wheels belong to different brake circuits, and one brake fluid reservoir (43, 44) is provided in each brake circuit for charging a pump element (28, 29) of the return pump (27) during the traction control operation.

34. A brake system as defined by claim 2, in which the driven wheels belong to different brake circuits, and one brake fluid reservoir (43, 44) is provided in each brake circuit for charging a pump element (28, 29) of the return pump (27) during the traction control operation.

35. A brake system as defined by claim 3, in which the driven wheels belong to different brake circuits, and one brake fluid reservoir (43, 44) is provided in each brake circuit for charging a pump element (28, 29) of the return pump (27) during the traction control operation.

* * * * *